United States Patent
Rilly et al.

[11] Patent Number: 5,530,488
[45] Date of Patent: Jun. 25, 1996

[54] CIRCUIT FOR THE CONTINUOUS ZOOM ADJUSTMENT OF THE PICTURE WIDTH IN A TELEVISION RECEIVER

[76] Inventors: Gerard Rilly, Panoramaweg 6, D-78089 Unterkirnach; Daniel Lopez, Forststr. 27, D-78126 Königsfeld, both of Germany

[21] Appl. No.: 211,895

[22] Filed: Jun. 2, 1994

[30] Foreign Application Priority Data

Nov. 2, 1991 [DE] Germany ............... 41 36 178.4

[51] Int. Cl.$^6$ ............... H04N 3/233; H04N 3/237
[52] U.S. Cl. ............... 348/704; 348/358; 348/747; 315/371; 315/408
[58] Field of Search ............... 348/747, 581, 348/746, 704, 358, 347; 315/371, 408; H04N 3/223, 3/233, 3/237

[56] References Cited

U.S. PATENT DOCUMENTS 4,028,726  6/1977  Argy ............... 358/165
4,956,585  9/1990  Rilly ............... 315/371

FOREIGN PATENT DOCUMENTS 1121648  1/1962  Germany.
3939884A1  6/1991  Germany ............... H04N 3/223
2140640  11/1994  United Kingdom.

Primary Examiner—James J. Groody
Assistant Examiner—Nina N. West
Attorney, Agent, or Firm—Joseph S. Tripoli; Eric P. Herrmann; Frederick A. Wein

[57] ABSTRACT

In a television receiver, having the ability to display differing image formats, the image width is capable of being continuously adjustable in the manner of a zoom effect. The ability to continuously adjust the image width is accomplished without any perceptible effect on the horizontal scan output. In that circuit, a tangent capacitor is coupled to a second capacitor with a switch being connected for switching the second capacitor into and out of the circuit. The switch is closed for an adjustable period beginning at the line center.

8 Claims, 3 Drawing Sheets

CIRCUIT FOR THE CONTINUOUS ZOOM ADJUSTMENT OF THE PICTURE WIDTH IN A TELEVISION RECEIVER

BACKGROUND OF THE INVENTION

In television receivers with differing picture formats of, for example, 4:3 and 16:9, there exists the desire to make the picture width adjustable in the sense of a zoom effect. This means, for example, that only a fraction of ⅔ of the signal of the line scanning (trace) time fully covers the picture screen from the left edge to the right edge, i.e. the deflection velocity is increased in the area about the line center and decreased towards the start of the line and towards the end of the line. As the line transformer operates as a pure switch such an alteration of the picture width through alteration of the drive control of the output stage transistor is not possible without further measures.

The invention is based on the task to create a simple circuit for a continuous adjustment of the picture width in the sense of a zoom effect which affects the current and voltage conditions at the line output stage transistor and the high voltage as little as possible.

Thus, with the invention, in principle, a further capacitor is allocated to the tangent capacitor present anyway. This further capacitor is controlled to be conductive always from the start at the line center for an adjustable period. Therefore, the invention does not interfere with the function as such of the line output stage transistor. Rather, it is based on a conscious modification of the tangent correction or S correction through the tangent capacitor wired in series with the deflection coils. Thus, the possibility of influencing the shape of the line deflection current by means of the tangent capacitor is exploited in an advantageous manner additionally for the continuous adjustment of the picture width in the sense of a zoom effect. The zoom effect, for example, the magnification of the picture width through increasing the deflection velocity, consequently happens not by means of amplitude alteration of control signals but merely through an alteration of the tuning of the line output stage by means of a conscious alteration of the effective value of the overall effective tangent capacitor.

An essential advantage of the invention lies in the fact that a relatively large ratio between the minimum and the maximum picture width can be achieved while there ensues no adverse influence on the high voltage, the East/West pin cushion correction circuit or the line output stage transformer. An essential fact hereby is that the current through the line output stage transformer need not be increased and, therefore, this transistor is not additionally stressed or endangered. The tangent capacitor and the additional capacitor can lie in the primary circuit, i.e. immediately in series with the deflection coils. It is of advantage to dispose the tangent capacitor in the secondary circuit of an additional transformer the primary winding of which lies in series with the deflection coils. In this solution the polarity and amplitude of the effective voltages, in particular of the parabolic voltage at the tangent capacitor, can be better controlled.

In a television receiver, in particular with differing picture formats, there exists the desire to make the picture width continuously adjustable in the sense of a zoom effect. The task is to create a simple circuit for continuous adjustment of the picture width which does not materially affect the line output stage.

A further capacitor (Cs2) is allocated to the tangent capacitor (Cs1), and a switch (S) is connected in parallel to said further capacitor. The switch is always closed starting in the center of the line for an adjustable period.

BRIEF DESCRIPTION OF THE DRAWINGS

The invention is explained in the following in several embodiment examples by means of the drawing. Therein show FIG. 1 a circuit according to the invention in simplified form on the primary side of the deflection circuit, FIGS. 2, 3, 4 curves for illustrating the operation and FIG. 5 a detailed circuit with the additional circuit according to the invention on the secondary side.

DETAILED DESCRIPTION OF THE PREFERRED EMBODIMENT

Figure 1:
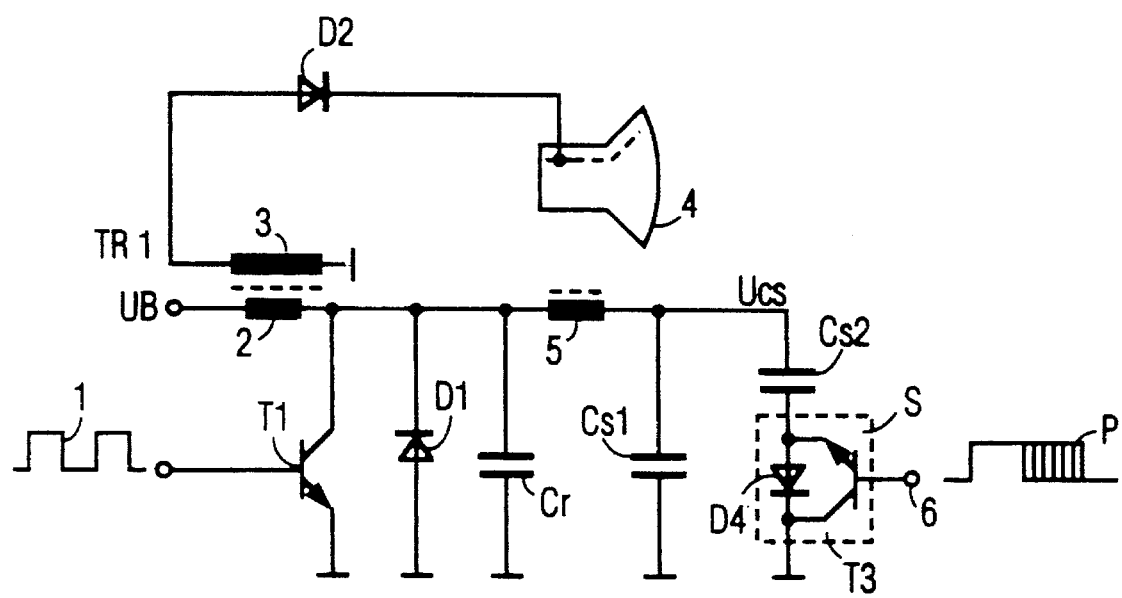

FIG. 1 shows a line deflection circuit with line frequency pulses 1, the line output stage transistor T1, the retrace (flyback) diode D1, the retrace capacitor Cr, the primary winding 2 as well as the high voltage winding 3 of the line transformer Tr1, the high voltage rectifier D2, the picture tube 4, the line deflection coils 5 and the tangent capacitor Cs1. The circuit described so far is state-of-the-art.

Figure 2:
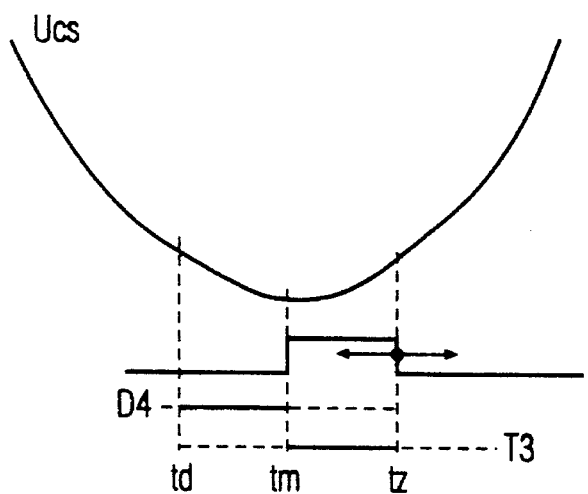

A second capacitor Cs2 is connected in parallel to the tangent capacitor Cs1 via the switch S with the transistor T3 and the diode D4. Switch S is actuated at terminal 6 by the switching voltage P. The switching voltage P controls transistor T3 according to FIG. 2 to be conductive, always from the line center tm on, for an adjustable (settable) interval until time tz. The current coming from Cs2 flows from td–tm through Diode D4 at which time it becomes zero and flows subsequently through transistor T3 controlled by P to be conductive. td and tz lie symmetrically about tm. Therefore, D4 and T3 are conductive, successively, for an equally long interval. D4 causes the parabolic voltage effective at S to be clamped to ground potential. In order to illustrate the operation two extreme cases shall be studied.

Normal operation without zoom effect. Hereby, transistor T3 is permanently conductive by switching voltage P. This means that Cs2 is permanently connected in parallel to the tangent capacitor Cs1 and, therewith, the effective tangent capacitor Cs1+Cs2 is at maximum. This means a small tangent correction, i.e. a small deformation of the deflection current. The value of the deflection current at the start and at the end of the line scanning period then corresponds to the deflection current values at the left and right picture edges. Thus, the signal of the line scanning interval is entirely reproduced on the available picture area. In this case, therefore, we have a case of usual deflection with complete presentation of the picture signal and only little overwriting without zoom effect.

Special operation with increased picture width and zoom effect. Transistor T3 is permanently blocked by switching voltage P. Now, capacitor Cs2 is no longer effective so that the effective tangent capacitor Cs is correspondingly small. Then, the result is a large tangent correction with an increase in the deflection velocity in the area of the picture center. Then, a part of the signal of the line scanning period is expanded symmetrically about the picture center in such a way that this part utilizes the entire width of the picture screen und, therewith, the picture is presented in enlarged form during this time. For example, the signal is then displayed for 40 μs of the line scanning time symmetrically about the picture center exactly from the left to the right picture edge.

By modifying the duration of the switching voltage P, i.e. the duration of the conductive phase of transistor T3 from tm–tz a continuous adjustment between the two states described is now possible. This means that the picture can be set to all desired intermediate values between normal operation and maximum zoom effect.

Figure 3:
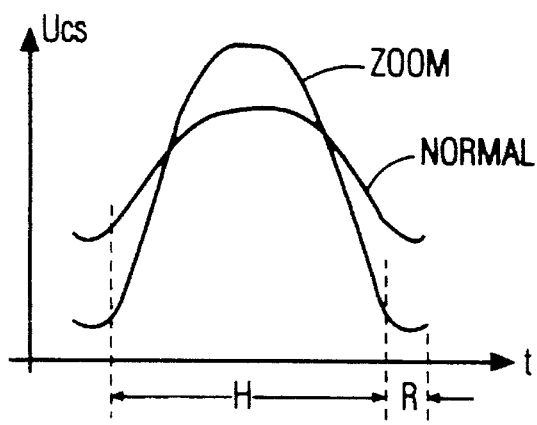

FIG. 3 shows the amplitude of the voltage Ucs at tangent capacitor Cs1 in one instance for normal operation and in one case for zoom operation with maximum increase of the deflection velocity in the area of the line center. The greater amplitude of Ucs in zoom operation is achieved by the reduction of the effective tangent capacitor Cs being caused to a greater or lesser extent.

Figure 5:
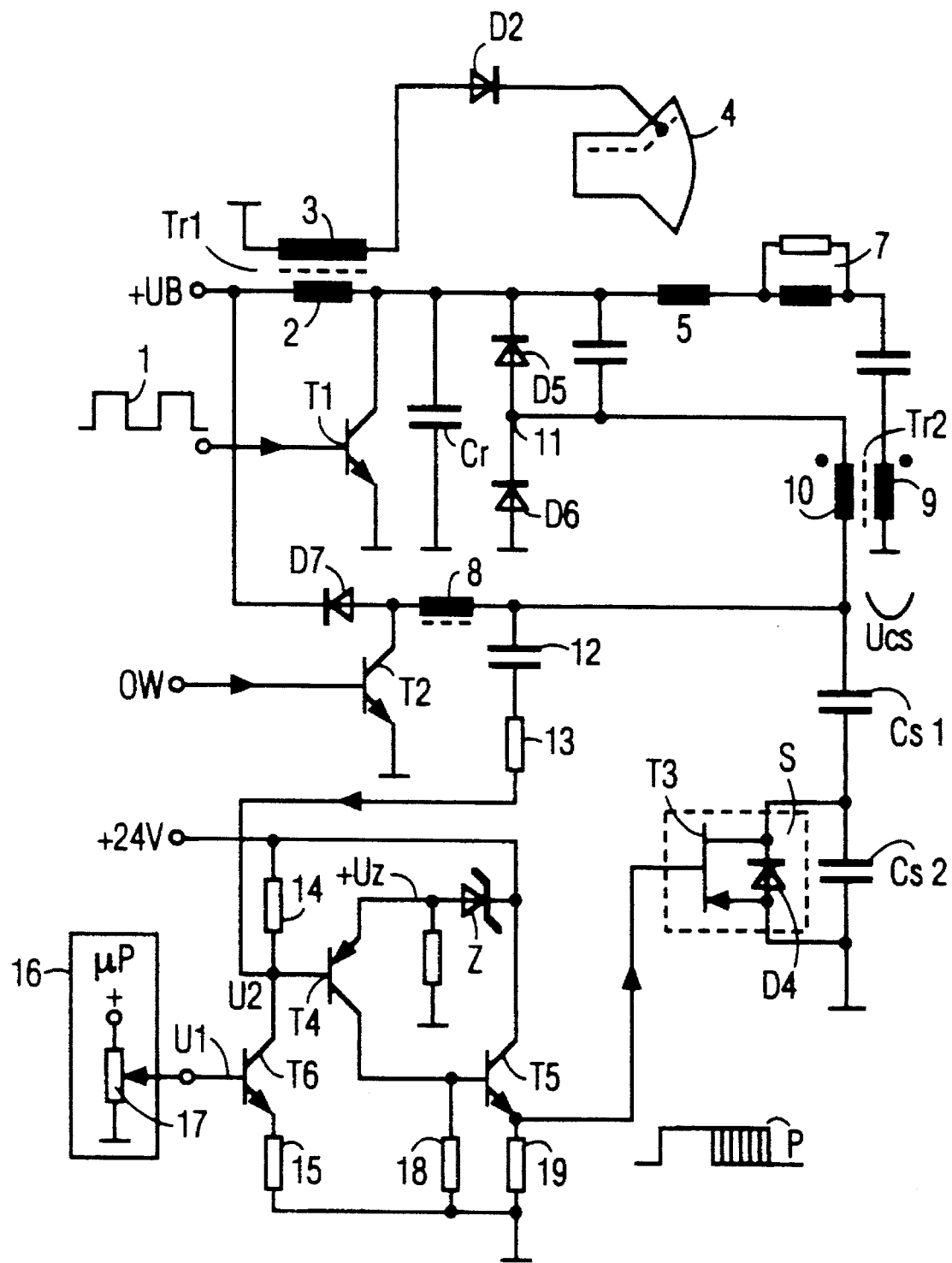

FIG. 5 shows, at first, again a circuit according to FIG. 1. The linearity coil 7, two recovery diodes D5, D6 and the East/West pin cushion correction circuit with the transistor T2, the Diode D7 and the coil 8 are additionally shown. The circuit for adjusting the zoom effect exhibits the following differences when compared to FIG. 1. Capacitors Cs1 and Cs2 are not connected in parallel but in series and switch S lies parallel to Cs2. The result is again the same effect as in FIG. 1 as the effective tangent capacitor, as in FIG. 1, is also increased with the short-circuiting of Cs2. Also, Cs1 and Cs2 are not clamped into the primary circuit, as in FIG. 1, but coupled to the primary circuit via transformer Tr2, separate from line transformer Tr1, with the primary winding 9 and the secondary winding 10. The upper end of secondary winding 10 is connected to the junction 11 of recovery diodes D5, D6. The control of transistor T3 in switch S through the pulse P happens, in principle, exactly as described by means of FIGS. 1, 2, 3. In the following, the shown circuit for generating the pulse P is explained. The circuit contains the transistor T4 to the emitter of which a constant positive voltage +Uz, stabilized by the Zener diode Z, is applied. The parabolic voltage Ucs present at tangent capacitor Cs1 is applied to the base of transistor T4 via capacitor 12 and resistor 13. The base is connected via resistor 14 with the positive operating voltage and also grounded via transistor T6 and resistor 15. A voltage U1 the value of which can be adjusted is applied to the base of transistor T6. U1 emanates from the microprocessor 16 which determines the desired zoom effect. The adjustment of the direct voltage U1 is indicated by the resistor 17 in the processor 16. Thus, the parabolic voltage Ucs at the base of T4 is superimposed with a direct voltage U2 whose value is determined by processor 16.

Figure 4:
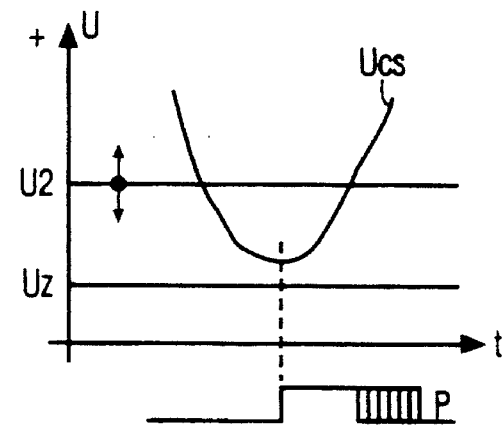

The operation is illustrated by means of the FIG. 4. If Ucs remains, by virtue of appropriate adjustment of U1 and U2, above Uz then transistor T4 does not become conductive so that transistor T5 also remains blocked. Then, the switching voltage P does not appear and transistor T3 remains blocked. This is the operating mode in which Cs2 effective, the effective tangent capacitor is small and, therewith, the zoom effect is at maximum. If U1 becomes larger then U2 becomes smaller. On reduction of U2, U2 finally reaches the value of +Uz so that T4 becomes conductive considering the base emitter voltage. Thereby, T5 operating as emitter follower together with resistors 18, 19 also becomes conductive and now generates the switching voltage P. It can be seen that the duration of the conductive phases of T4 and T5 and therewith the duration of the switching voltage P depends on the voltage U2 and, thus, on the voltage U1. Therefore, the respective desired zoom effect in the sense of FIG. 1 can be adjusted by actuating the symbolically indicated potentiometer 17 in the processor 16. Thus, the shown circuit is capable of generating the switching voltage P always starting at the line center tm and with adjustable duration.

We claim:

1. Circuit for continuous zoom adjustment of the picture width in a television receiver with a line output stage, line deflection coils and a tangent capacitor lying in the path of the deflection current, comprising:

a second capacitor being connected one of in series and in parallel with the tangent capacitor, and a switch being connected one of in parallel and in series with the second capacitor, respectively, the switch being closed by a switching voltage starting at a line center for a period which is adjustable in duration.

2. Circuit according to claim 1, wherein one of the tangent capacitor and the second capacitor is coupled via a transformer to the path of the deflection current.

3. Circuit according to claim 2, wherein the tangent and second capacitors are connected in series with a secondary winding of a transformer having a primary winding in series with the path of the deflection current.

4. Circuit according to claim 3 wherein one end of the secondary winding is connected to a center point of a series connection of two recovery diodes which are coupled in parallel with a line output stage transistor.

5. Circuit according to claim 3, wherein a line high voltage transformer is utilized.

6. Circuit according to claim 1, wherein the switching voltage is derived from the output of a comparator circuit (T4) to which the sum of a parabolic voltage (Ucs) at the tangent capacitor (Cs), and an adjustable direct voltage (U2) as well as a fixed reference direct voltage (Uz) are applied.

7. Circuit according to claim 6, wherein the comparator circuit includes a transistor having a base electrode coupled via a capacitor to the tangent capacitor and the tap of an adjustable voltage divider being fed with a direct voltage to the emitter electrode of the transistor with a reference voltage stabilized by a Zener diode being applied, and the switching voltage being derived from the collector electrode of the transistor.

8. Circuit according to claim 1, wherein the switch is formed by a parallel connection of a MOSFET transistor and a diode.

* * * * *